United States Patent
Goick

(10) Patent No.: US 7,908,750 B2
(45) Date of Patent: Mar. 22, 2011

(54) SYSTEM AND METHOD FOR DECORATING CAKES AND CONFECTIONS

(76) Inventor: Sharon Ree Goick, Concord, NC (US)

(*) Notice: Subject to any disclaimer, the term of this patent is extended or adjusted under 35 U.S.C. 154(b) by 147 days.

(21) Appl. No.: 12/286,663

(22) Filed: Oct. 1, 2008

(65) Prior Publication Data

US 2010/0080876 A1    Apr. 1, 2010

(51) Int. Cl.
*G01C 15/00*     (2006.01)
(52) U.S. Cl. .................. 33/286; 33/533; 33/DIG. 21
(58) Field of Classification Search ............. 33/286, 33/288, DIG. 21, 533, 549, 653
See application file for complete search history.

(56) References Cited

U.S. PATENT DOCUMENTS

| | | | |
|---|---|---|---|
| 4,531,292 A | 7/1985 | Pasternak | 33/18 R |
| 4,838,696 A * | 6/1989 | Pryor | 356/602 |
| 4,910,541 A * | 3/1990 | Morgan | 353/28 |
| 4,910,661 A | 3/1990 | Barth et al. | 364/167.01 |
| 5,505,775 A | 4/1996 | Kitos | 118/14 |
| 5,588,216 A * | 12/1996 | Rank et al. | 33/286 |
| 5,630,308 A | 5/1997 | Guckenberger | 53/412 |
| 5,718,054 A * | 2/1998 | Kitajima | 33/227 |
| 5,795,395 A | 8/1998 | Ben-Matitayhu et al. | 118/712 |
| 5,880,714 A * | 3/1999 | Rosenberg et al. | 345/156 |
| 6,226,881 B1 | 5/2001 | Landauer | 33/515 |
| 6,334,684 B1 * | 1/2002 | Yoshida et al. | 353/28 |
| 6,347,457 B1 * | 2/2002 | Espinoza et al. | 33/288 |
| 6,499,842 B1 | 12/2002 | Kofman et al. | 347/105 |
| 6,578,276 B2 * | 6/2003 | Patton et al. | 33/18.1 |
| 6,601,309 B1 * | 8/2003 | Hedstrom | 33/286 |
| 6,616,958 B1 | 9/2003 | Stewart | 426/383 |
| 6,668,466 B1 * | 12/2003 | Bieg et al. | 33/503 |
| 6,903,841 B2 | 6/2005 | Spurgeon et al. | 358/1.18 |
| 7,219,437 B2 * | 5/2007 | Dallman | 33/286 |
| 7,286,258 B2 | 10/2007 | Schnoebelen et al. | 358/1.18 |
| 7,302,888 B2 | 12/2007 | Huang et al. | 101/35 |
| 7,322,229 B2 * | 1/2008 | Wilhelm | 73/104 |
| 7,469,480 B2 * | 12/2008 | Nottingham et al. | 33/286 |
| 2004/0022905 A1 | 2/2004 | Verba | 426/112 |
| 2006/0168828 A1 * | 8/2006 | Dallman | 33/286 |

FOREIGN PATENT DOCUMENTS

| | | |
|---|---|---|
| JP | 1-101848 | 4/1989 |
| JP | 2005-110575 | 4/2005 |

OTHER PUBLICATIONS

Red Line laser Module, © 2006, http://www.worldstartech.com/products-laser_line_generators_red_laser.

\* cited by examiner

*Primary Examiner* — Yaritza Guadalupe-McCall
(74) *Attorney, Agent, or Firm* — Monahan & Moses, LLC; Thomas L. Moses

(57) ABSTRACT

The system and method for decorating cakes and confections includes an adjustable stand for a laser, which is used to project cake decorating guidelines. The stand includes a base member and a removable vertical rod member that extends from the base. A generally horizontal rod may be attached to the vertical rod by an adjustable clamp or other device, so that it may be secured to the vertical rod at any point, so that the height of the horizontal rod above the base may be adjusted to any desired position. Further, the clamp for the horizontal rod may pivot, so that the horizontal rod may be rotated angularly from the vertical rod upwardly or downwardly, as desired. A laser line generator includes a clamp member, or similar device, so that the laser may be positioned along either the vertical rod or the horizontal rod in any desired position.

3 Claims, 5 Drawing Sheets

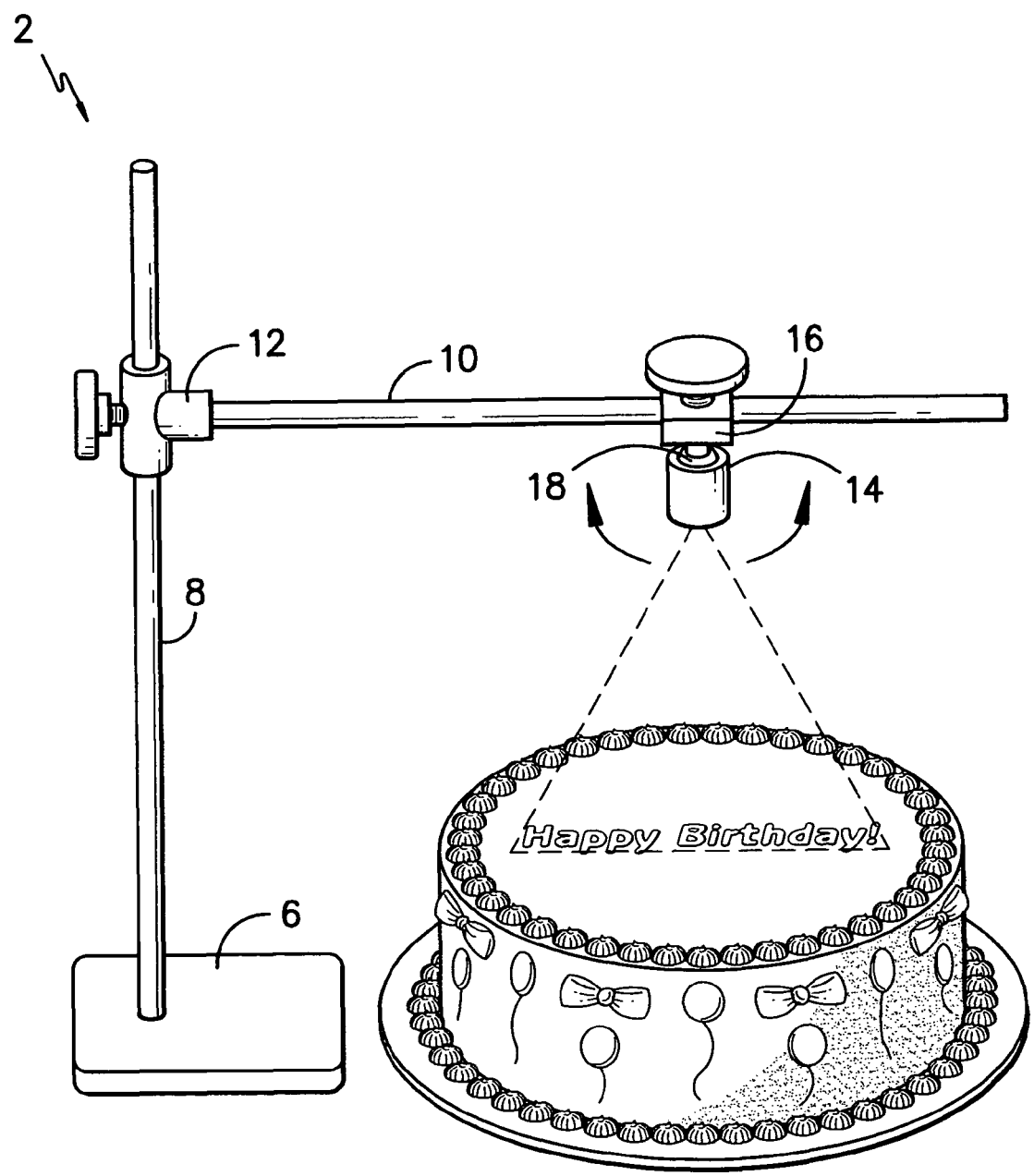
FIG. —1—

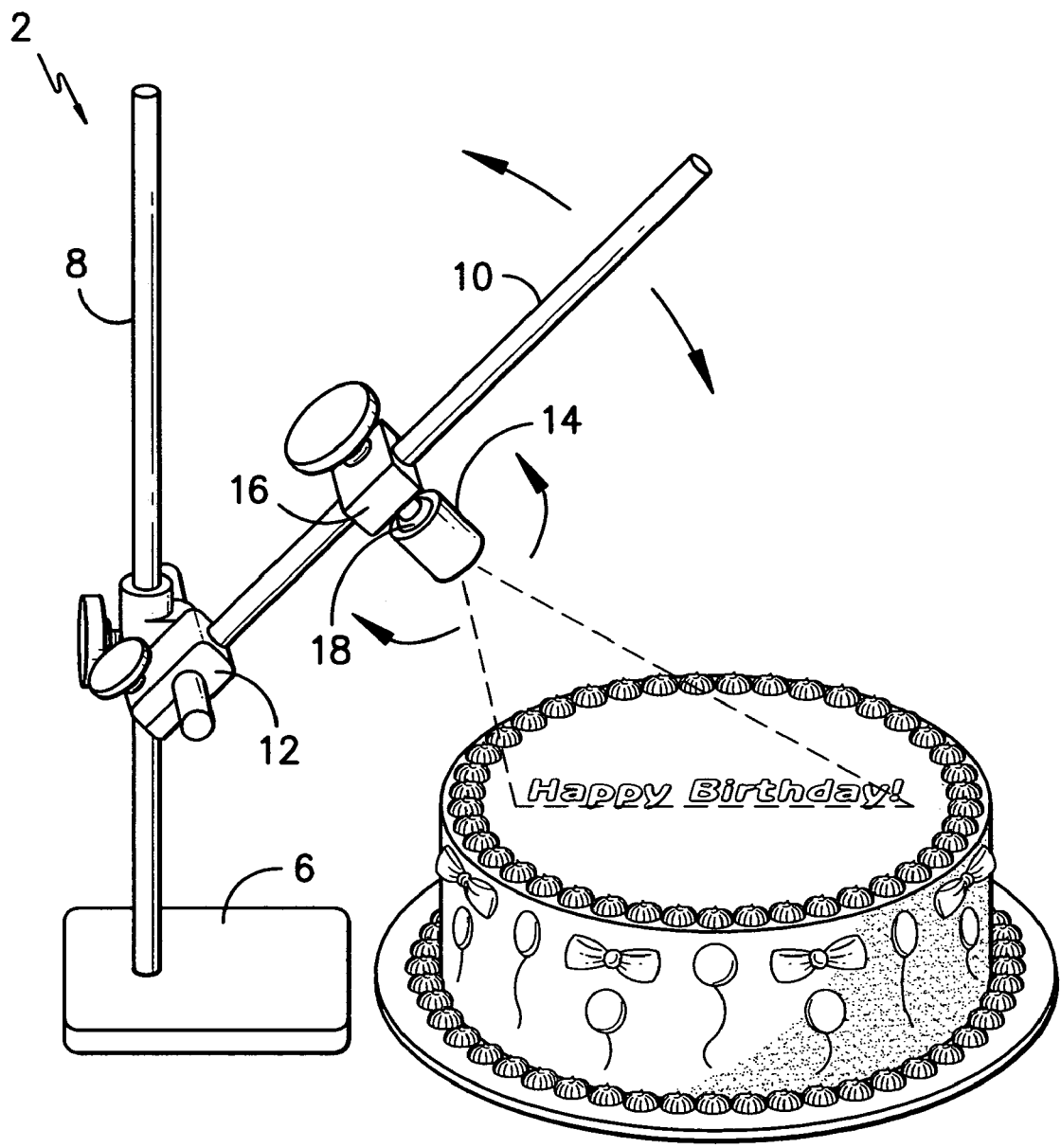
FIG. -2-

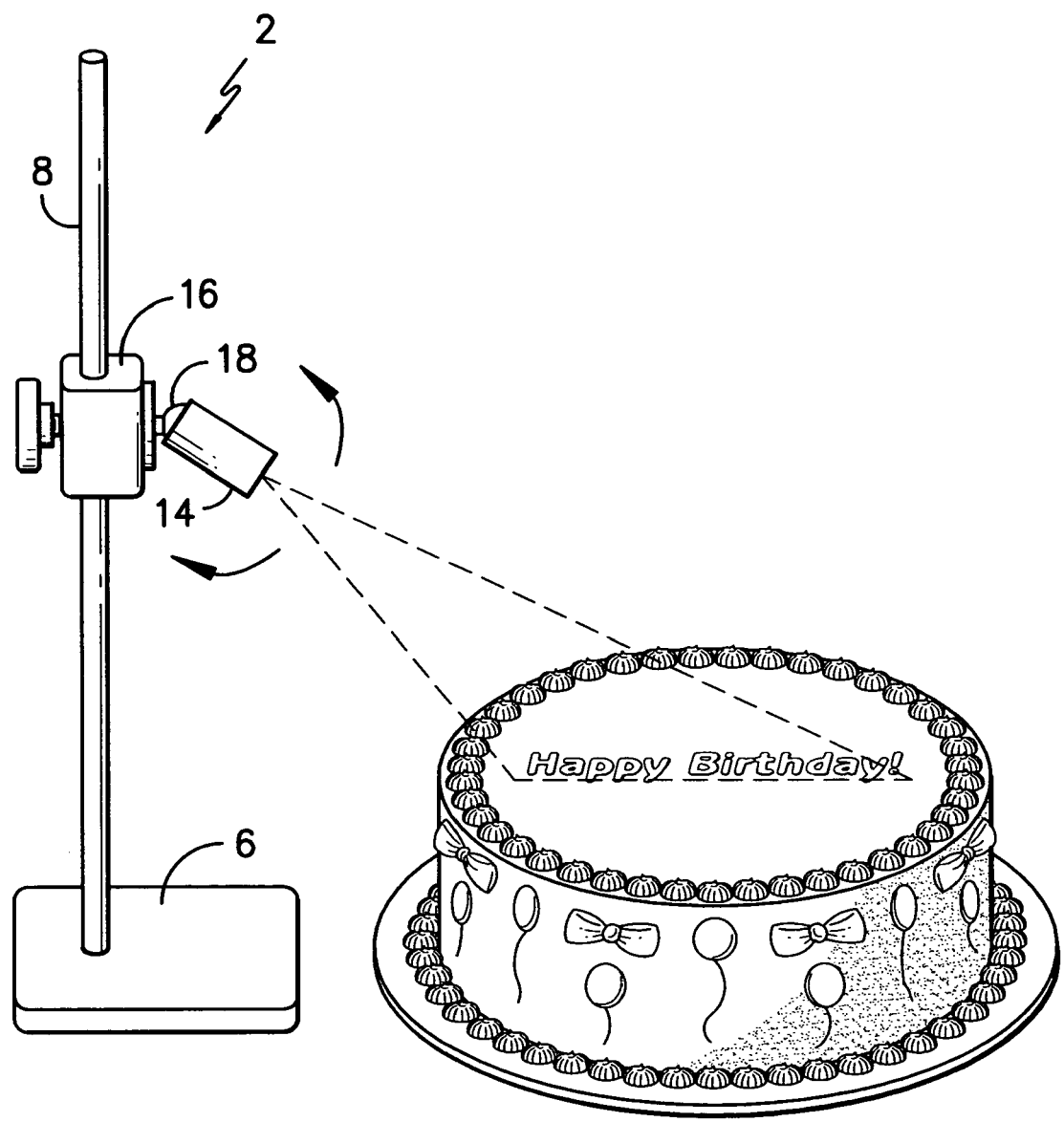
FIG. −3−

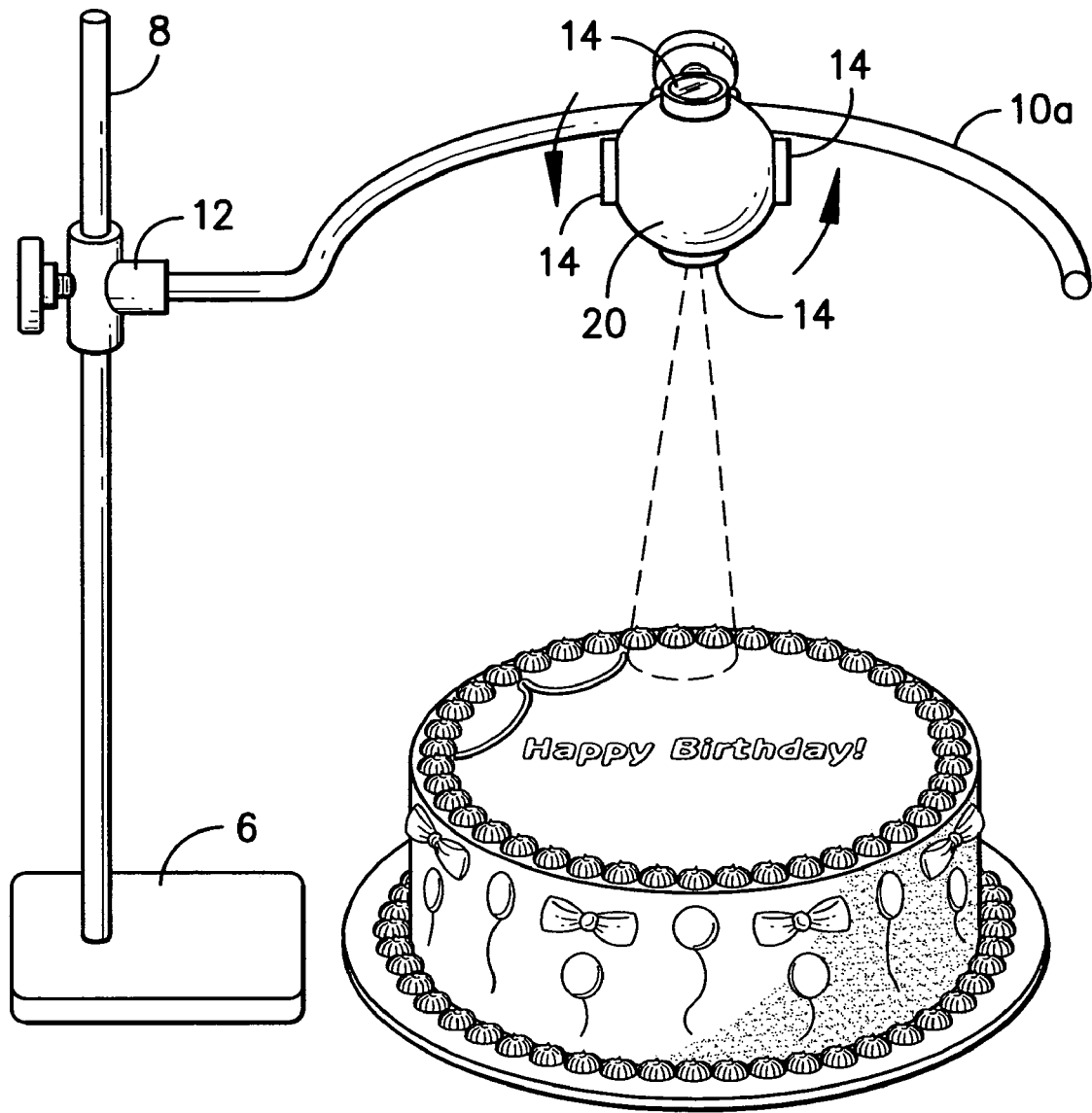
FIG. -4-

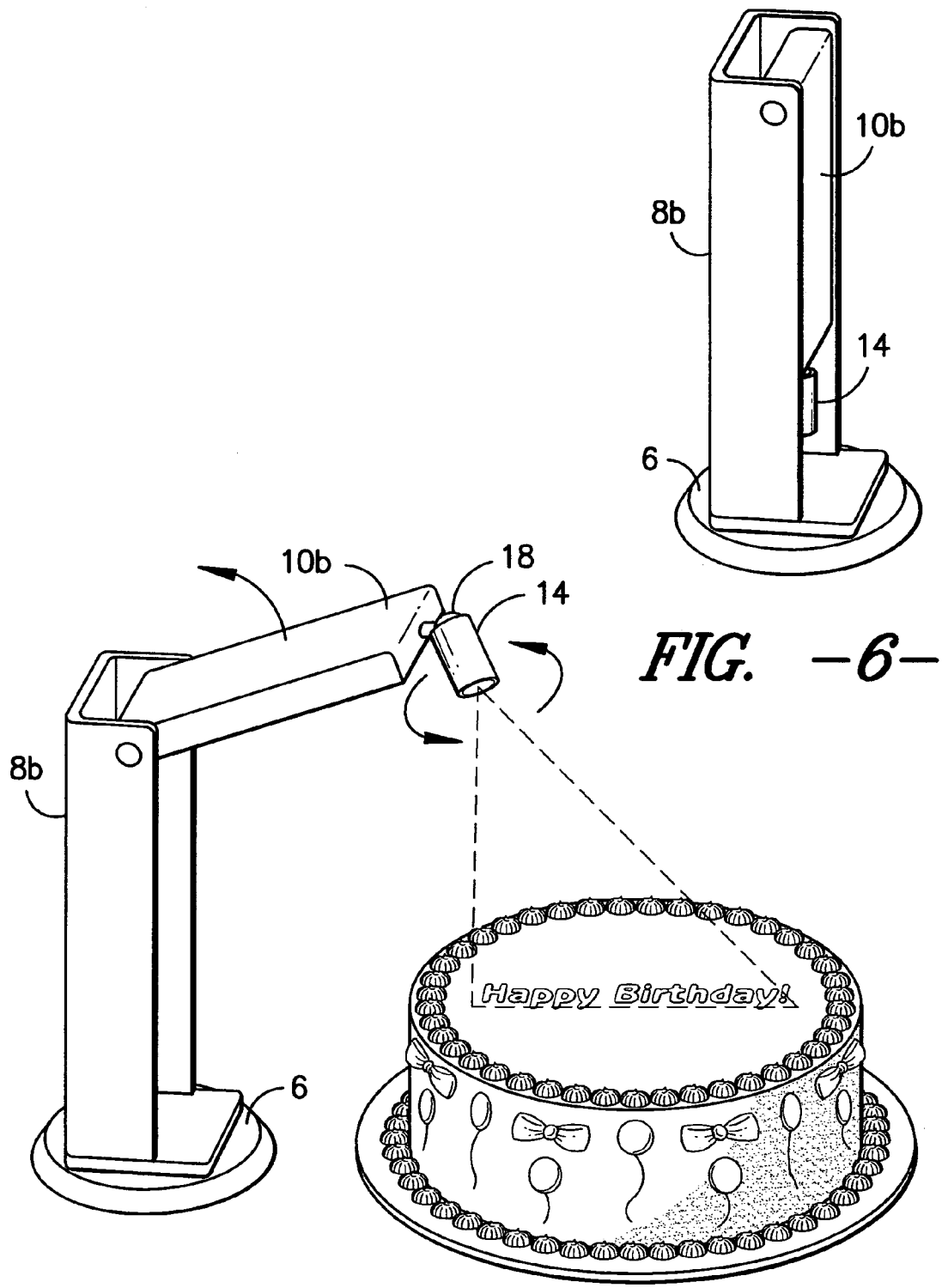
FIG. -6-
FIG. -5-

SYSTEM AND METHOD FOR DECORATING CAKES AND CONFECTIONS

BACKGROUND OF THE INVENTION

The present invention relates generally to cake decorating systems and methods. More specifically, the present invention includes an adjustable stand and a laser for generating temporary lines and shapes on a cake as a guide for the cake decorator to follow.

One problem associated with cake decorating is the difficulty of writing a message on the cake using edible frosting, such as "Happy Birthday" or the like, in a straight line. Without the use of a guideline, similar to the lines routinely printed on notebook paper, it is difficult to write a cake message that appears to be straight. Further, many cakes are decorated with a repeating pattern using edible frosting or the like, and it is problematic for the cake decorator to create such a repeating pattern using a freehand technique.

Therefore, it would be desirable to provide an adjustable stand and a laser that generates a laser line that may be illuminated onto the surface of the cake as a guideline for the cake decorator to follow, either for writing messages or for providing other shapes or patterns. The benefit of such an apparatus and technique is that the laser line does not affect the cake itself, and provides a guideline for applying edible cake decorations, thus resulting in a more aesthetically pleasing cake.

OBJECTS OF THE INVENTION

Therefore, it is an object of the present invention to provide a cake decorating tool, which includes an adjustable stand and at least one laser line generator that illuminates a line, shape, or object on the surface of a cake as a guideline for the cake decorator to follow while decorating the cake.

Additionally, it is an object of the present invention to provide a laser guideline generator on an adjustable stand that is inexpensive to manufacture and easy to use.

Further, it is an object of the present invention to provide a cake decorating tool with a laser line generator that may be used on cakes and other confections of any size and shape Still another object of the present invention is to provide a cake decorating tool that may be disassembled or folded into a compact position and stored compactly when not in use.

SUMMARY OF THE INVENTION

In a preferred embodiment, the system and method for decorating cakes and confections includes an adjustable stand for a laser, which is used to project cake decorating guidelines. The stand includes a base member and a removable vertical rod member that extends from the base. In one embodiment, the vertical rod member includes a threaded portion at its bottom end that may be screwed into a threaded receiving hole on the top of the base. A generally horizontal rod may be attached to the vertical rod by an adjustable clamp or other device, so that it may be secured to the vertical rod at any point, so that the height of the horizontal rod above the base may be adjusted to any desired position. Further, the clamp for the horizontal rod may pivot, so that the horizontal rod may be rotated angularly from the vertical rod upwardly or downwardly, as desired.

A laser line generator includes a clamp member, or similar device, so that the laser may be positioned along either the vertical rod or the horizontal rod in any desired position. Additionally, the clamp member for the laser line generator may allow the laser line generator to be pointed in any desired direction. In one embodiment, the clamp member for the laser line generator may include a ball and socket joint to allow the freedom of rotation for the laser so that it may be positioned as desired to illuminate the laser light on the cake or confection.

BRIEF DESCRIPTION OF THE DRAWINGS

These and other features, aspects, and advantages of the present invention will become better understood with regard to the following description, appended claims, and accompanying drawings where:

FIG. 1 is a perspective drawing of one embodiment of the adjustable stand and laser, wherein the horizontal rod is positioned in a generally horizontal position;

FIG. 2 is a perspective drawing of one embodiment of the adjustable stand and laser, wherein the horizontal rod is positioned in an angularly raised position;

FIG. 3 is a perspective drawing of one embodiment of the adjustable stand and laser, wherein the laser is positioned on the vertical rod;

FIG. 4 is a perspective drawing of one embodiment of the adjustable stand and laser, wherein the horizontal bar is formed in the shape of a semi-circle, and the laser member is in the shape of a round ball, having four different lasers, each of which illuminate a different laser light shape;

FIG. 5 is a perspective drawing of another embodiment of the adjustable stand and laser, wherein a fixed vertical support member having a generally U-shaped cross section is mounted on a base member, and a pivoting arm is attached to an upper portion of the fixed vertical support member with a laser at a distal end thereof; and FIG. 6 is a perspective drawing of the embodiment shown in FIG. 5, wherein the pivoting arm and laser are folded into a compact position within the vertical support member for storage purposes when not in use.

DETAILED DESCRIPTION OF THE INVENTION

A first embodiment of the system and method for decorating cakes and confections is shown in FIG. 1. An adjustable stand 2 in combination with one or more laser line generators 14 is provided. The adjustable stand 2 includes a base member 6 and a vertical rod 8 extending upwardly from the base member 6. The vertical rod 8 may be removable, and in one embodiment, the bottom portion of the vertical rod 8 includes threads that may be received by and correspond with a threaded hole in the top of the base member 6. A generally horizontal rod member 10 is removably attached to the vertical rod member 8 via a first clamp member 12 or similar device, so that the horizontal rod 10 may be removably secured to the vertical rod member 8 at any desired level. Optionally, the first clamp member 12 may also include a pivoting feature that allows the horizontal rod to pivot, as shown in FIG. 2. This arrangement allows the horizontal rod member 10 to be angularly moved upwardly or downwardly, as desired, and secured in the desired angular position. It should be understood that the horizontal rod 10 may be in the form of a straight rod, a semi-circularly curved rod (as shown in FIG. 4), a ring, or any other desired shape.

A laser 14 is connected to a second clamp member 16, and may be attached either to the vertical rod 8 or to the horizontal rod 10 in any desired position. Optionally, the second clamp member 16 may include a ball and socket arrangement 18, to provide freedom of rotation of the laser 14 so that it may be directed in any desired direction. The laser 14 provides a laser image of a line, shape, or any other desired design, so that the cake decorator may use the laser line or lines as a guideline for decorating the cake or other confection with frosting, icing, or any other edible decoration.

In use, the stand 2 is placed adjacent a cake or other confection to be decorated, and the laser 14 is positioned either on the vertical rod 8 or the horizontal rod 10, as desired. When used as a guideline for writing, the laser 14 is directed at the surface of the cake, and positioned so that the laser line forms the baseline for the text to be written in edible frosting or the like. Similarly, when the laser 14 is used to display a shape or pattern on the cake or confection, the laser is positioned so that the light is displayed in the appropriate place on the surface of the cake, and then the cake decorator simply uses the laser light line or lines by applying the edible frosting along the laser light line or lines. If necessary, multiple lasers 14 may be used to produce the desired effect, and each laser 14 may be positioned as desired on the stand.

When using the circular horizontal rod, preferably the center of the circular rod is positioned generally above the cake in a centralized fashion. The laser 14 may be moved about the periphery of the cake as desired, and attached to the circular horizontal rod.

Similarly, when using a semi-circular rod 10a (as shown in FIG. 4), the stand may be placed into a position as shown, so that the laser 14 may be shifted to and positioned at any point along the semi-circular horizontal rod as desired. Additionally, the laser line generator shown in FIG. 4 may be employed. This laser line generator includes several lasers 14 spaced about a ball shaped housing 20, each capable of illuminating light lines of a different shape. In this embodiment, the cake decorator simply chooses which laser line shape they want to use as a guideline, and rotates the ball housing 20 so that the laser 14 providing the corresponding desired shape is directed toward the cake in the desired position.

Optionally, a second type of adjustable stand may be used. In one embodiment, shown in FIGS. 5 and 6, the adjustable stand includes a vertical support member 8b with a U-shaped cross section that is positioned on a base member 6, and a pivoting support member 10b that is connected to the top of the vertical support member via a hinge component. A laser 14 is disposed near the distal end of the pivoting support member 10b. When in use, the pivoting support member 10b is moved to its desired angular position so that the laser 14 is pointed at the desired position on the cake or confection. The pivoting support member 10b may be folded down so that it fits into the vertical support member when not in use, or for storage purposes, as shown in FIG. 6. In a preferred embodiment, the laser is attached with means providing a large degree of freedom of motion, such as a ball and socket joint 18 as shown in FIG. 5.

It should be understood that other types of stands may be used, including stands with multiple bases or stands employing a flexible gooseneck support for the laser line generator, so long as they have the capability to be adjusted so that the laser line may be illuminated on the cake or confection as desired by the decorator. Laser line generators as discussed herein are commonly available in the market today.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A system for decorating cakes and confections, said system comprising:
   a base member;
   a generally vertical support member having a generally U-shaped cross section, said vertical support member being attached to said base member;
   a pivoting support member attached to an upper end of said vertical support member so that said pivoting support member may be positioned within said vertical support member when not in use, and may be raised into any desired angular position with respect to said vertical support member; and
   a laser line generator attached to a distal end of said pivoting support member.

2. The system for decorating cakes and confections set forth in claim 1, wherein said laser line generator includes means for adjusting the direction of said laser line generator.

3. The system for decorating cakes and confections set forth in claim 2, wherein said means for adjusting said direction of said laser line generator includes a ball and socket joint.

* * * * *